Jan. 30, 1962  SIGEMI NAKATA  3,018,557
DEPTH MICROMETER
Filed Oct. 24, 1960
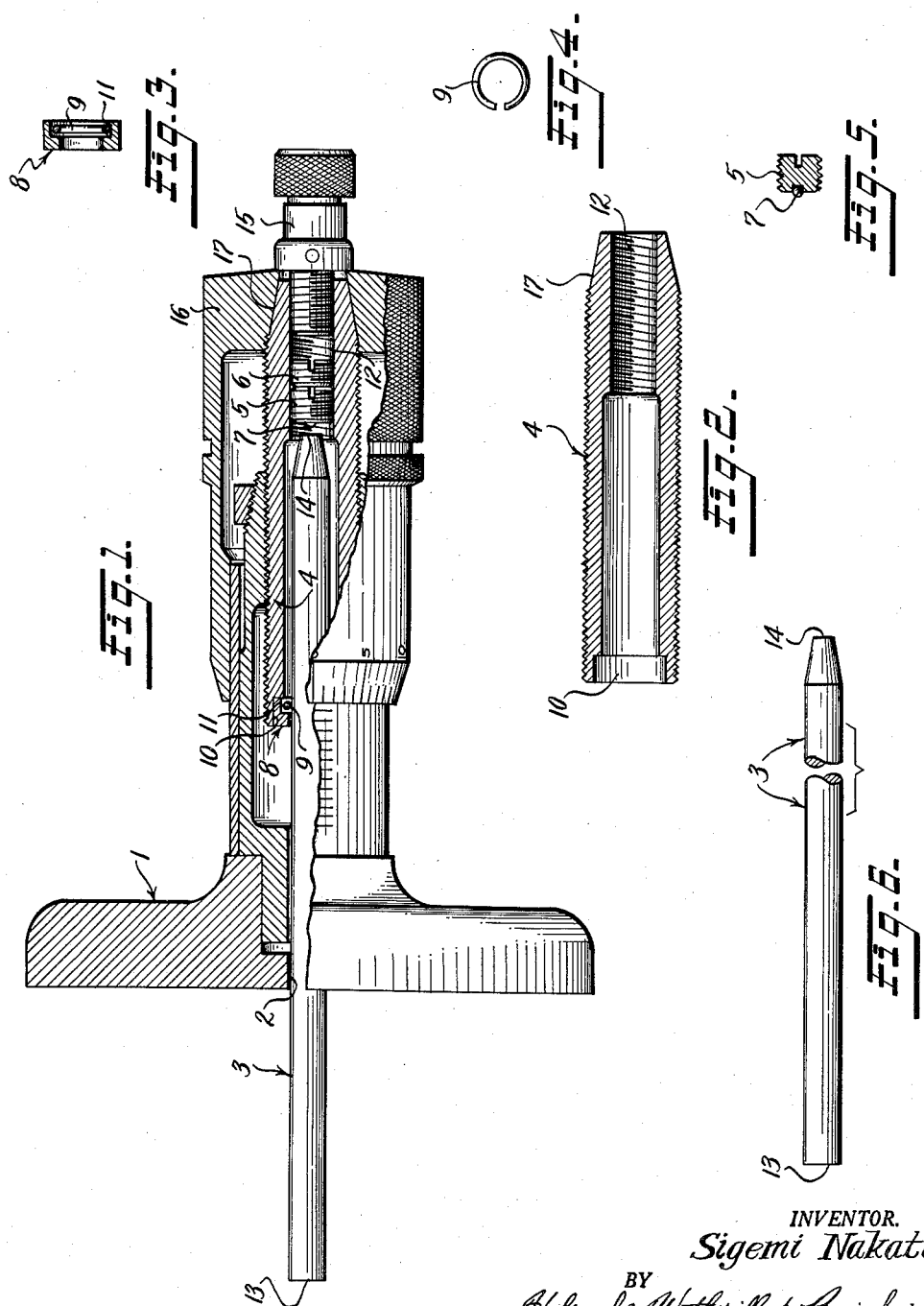
INVENTOR.
Sigemi Nakata
BY
Holcombe, Wetherill & Brisebois
ATTORNEYS United States Patent Office 3,018,557
Patented Jan. 30, 1962

3,018,557
DEPTH MICROMETER
Sigemi Nakata, 263 1-chome, Nishiosaki, Shinagawaku,
Tokyo, Japan
Filed Oct. 24, 1960, Ser. No. 64,358
Claims priority, application Japan Mar. 26, 1960
2 Claims. (Cl. 33—170)

The present invention concerns a depth micrometer which consists of a depth micrometer body having a C ring spring attached near its end toward the base on the inner wall of a spindle pipe screw and a work stop screw with a hard, wear-resistant, small ball near its end toward the thimble; and of an insertion rod, which is independent of said depth micrometer body and can be freely slipped in at a guide hole of the base; the said rod being inserted into said spindle pipe screw through said guide hole so that it may touch said small ball and at the same time it may be very lightly held by said ring spring so as to be sensitive to the rotational movement of said thimble; the rotation of said thimble causing the rotation and displacement of said rod; the feature of said depth micrometer being that when a measuring pressure is applied to the other end surface of said rod, said rod ceases to rotate, thus assuring the possibility of measuring under invariably constant pressure as applied through a point on said ball; the purpose of the present invention being to enable replacement of said insertion rod without detaching said thimble every time (as would be necessary if said spindle pipe screw were combined with said insertion rod), and thereby giving accurate, rapid reading and enlarged scope of measurement.

The following is an explanation of an example of application of the present invention with reference to the attached drawing, in which FIGURE 1 is a front view of the device with the base and thimble partially cut away;

FIGURE 2 is a longitudinal section of its spindle pipe screw;

FIGURE 3 is a longitudinal section of its spring bush;

FIGURE 4 is a side view of its spring;

FIGURE 5 is a longitudinal section of its work stop screw; and

FIGURE 6 is a front view showing the two ends of an insertion rod.

On the inner wall of the spindle pipe screw 4 a seat 10 is bored near the end toward the base 1. A spring bush 8 is tightly pressed into said seat. The other end of said screw is equipped with a female screw portion 12. Into said female screw is fitted a work stop screw 5 with a tight-fitting small ball 7 made of a hard, wear-resistant material. Said screw 5 can be fixed in an arbitrary position by a clamp screw 6.

The insertion rod 3 can be slipped into the guide hole 2 of the base 1 from its end 13 or 14 with an adequately infinitesimal tolerance, that is, with neither slack nor sticking. The spring bush 8, pressed into the spindle pipe screw 4, has in its groove 11 a near-oval, C ring spring 9 inserted slackless in the longitudinal direction in such manner that it can rotate. Therefore, when said rod 3 is slipped in at said hole 2, said rod 3 is very gently held by said spring 9 in a state ready to rotate; its end abuts against the small ball 7 of a work stop screw 5 of said spindle pipe screw 4.

Said pipe screw 4 has a tapered portion 17 at one end which is fixed to the inside of its thimble 16 and the knob 15.

Suppose now said thimble 16 is rotated by means of said ratchet 15. Then, said spindle pipe screw, too, will rotate with it and in accordance with this rotation the insertion rod 3, which is softly held by said spring 9, will also move longitudinally while rotating within the chamber hole 2 in the base 1.

For measurement, the thimble 16 is rotated in order to rotate the insertion rod 3, which is the measuring instrument. When the measuring surface 13 of said rod 3 comes into contact with the object to be measured, and a measuring pressure acts on the latter, said rod ceases to rotate and the thimble 16 begins to skid at one point on the small ball 7 pressed into the work stop screw 5. Therefore the measured value has only to be read just when the frictional resistance to rotation of the insertion rod between the measuring surface 13 and the object to be measured comes to naught.

Such being the principle of the present invention, there is no frictional resistance to relative rotation between the measuring surface and the object to be measured; thereupon, measurement can be made under constant pressure and accordingly reading of measured value is extremely accurate, entirely free from individual errors of the executor of measurement. Moreover, as soon as the insertion rod, which is the measuring instrument, touches the object to be measured, said rod comes to a stop; thus there is absolutely no fear of the object to be measured being damaged or the measuring surface of said rod being injured.

Since the insertion rod is slipped in at the guide hole of the base, insertion is done with extreme care and alacrity, free from any bother to take off the thimble every time; moreover, if several rods, long and short, are provided, measurements can be carried out of various holes, shallow to deep, over a wide range. Even a single rod can be utilized in two ways with varied direction of insertion. That is, as indicated in the drawing, if its one end is cut off in relatively sharp form like a truncated cone with its other end retaining a cylindrical form, the sharper end 14 may be used as measuring surface, which will be fit for easy measurement of the depth of a narrow groove.

Further, the said work stop screw will be highly useful for accurate calibration of zero scale.

What I claim is:

1. A depth micrometer comprising an elongated hollow base member open at one end, a hollow spindle pipe screwed into the other end of said base member for longitudinal adjustment relative thereto, resilient gripping means seated within the end of said spindle pipe nearest the open end of said base, a small hard, wear-resistant ball stop mounted in said spindle pipe away from said resilient gripping means, and an insertion rod dimensioned to be inserted into said spindle pipe and held softly by said gripping means with one end resting against said ball stop and the other projecting outwardly from said base member, so as to rotate with said spindle pipe as it is adjusted within said base member until further rotation of said insertion member is prevented by frictional contact between its outwardly projecting end and an object to be measured, said spindle pipe and base carrying a cooperating scale and indicator to indicate the position of said spindle pipe relative to said base.

2. A depth micrometer as claimed in claim 1 in which said ball stop is adjustably mounted in said spindle pipe.

No references cited.